3 Sheets—Sheet 1.

O. P. DRAKE, dec'd.
F. G. Drake, Adm'r.
CARBURETER.

No. 193,232. Patented July 17, 1877.

Witnesses:
H B Sargent Jr
S Proctor Thayer

Oliver P. Drake dec'd.
Inventor:
Francis G. Drake Administrator
By
Attorneys

O. P. DRAKE, dec'd.
F. G. Drake, Adm'r.
CARBURETER.

No. 193,232. Patented July 17, 1877.

Witnesses.

Inventor:

O. P. DRAKE, dec'd.
F. G. Drake, Adm'r.
CARBURETER.

No. 193,232.  Patented July 17, 1877.

Witnesses.
H B Sargent Jr
S Proctor Thayer.

Oliver P. Drake dec'd.
Inventor.
Francis G. Drake Administrator
By Attorneys

UNITED STATES PATENT OFFICE.

OLIVER P. DRAKE, (FRANK G. DRAKE, ADMINISTRATOR,) OF BOSTON, MASS.

IMPROVEMENT IN CARBURETERS.

Specification forming part of Letters Patent No. 193,232, dated July 17, 1877; application filed April 13, 1877.

*To all whom it may concern:*

Be it known that OLIVER P. DRAKE, formerly of Boston, in the county of Suffolk and State of Massachusetts, now deceased, did invent a new and useful Improvement in Carbureters, and the following is a full, clear, and exact description of the invention.

The object of the invention is the production of a rich illuminating-gas of an equal and reliable density when manufactured, by the admixture of common atmospheric air and the vapor of hydrocarbons, or by the carbureting of common coal-gas.

The invention relates to the construction and arrangement of parts as hereinafter described and claimed.

The several improvements are more fully illustrated and shown in the annexed drawings.

Figure 1:
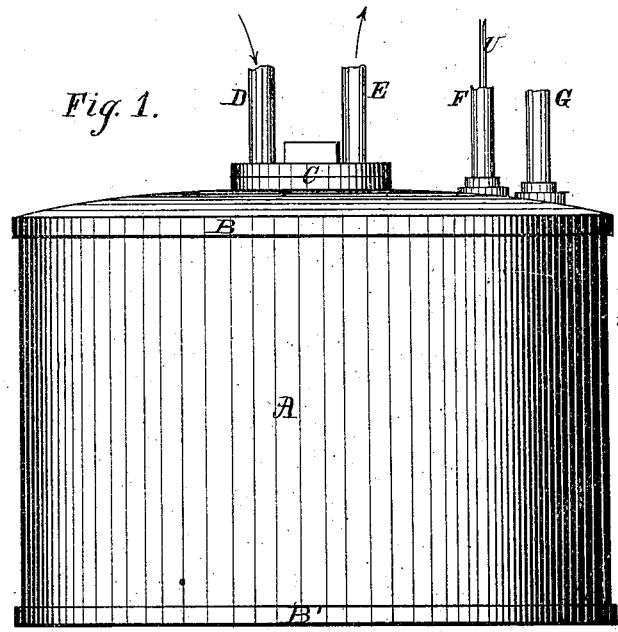
Figure 2:
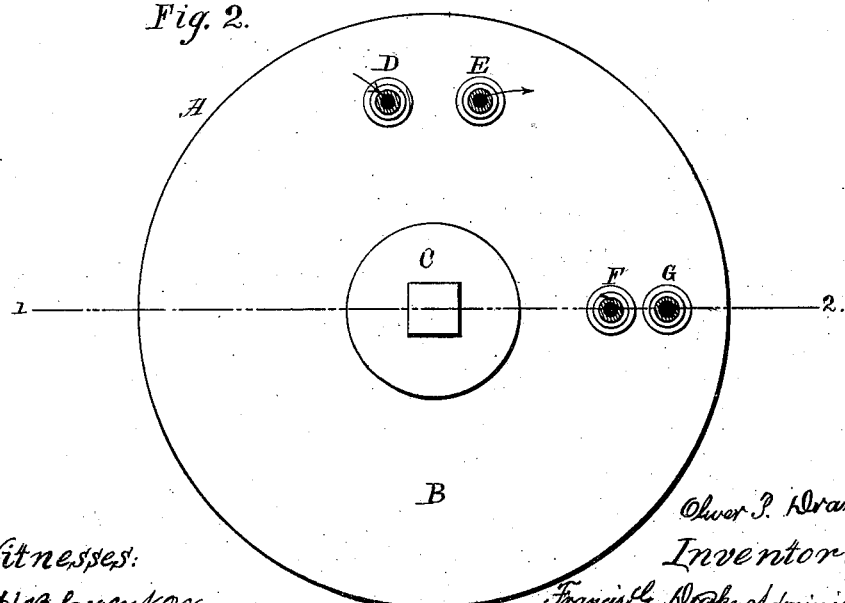
Figure 3:
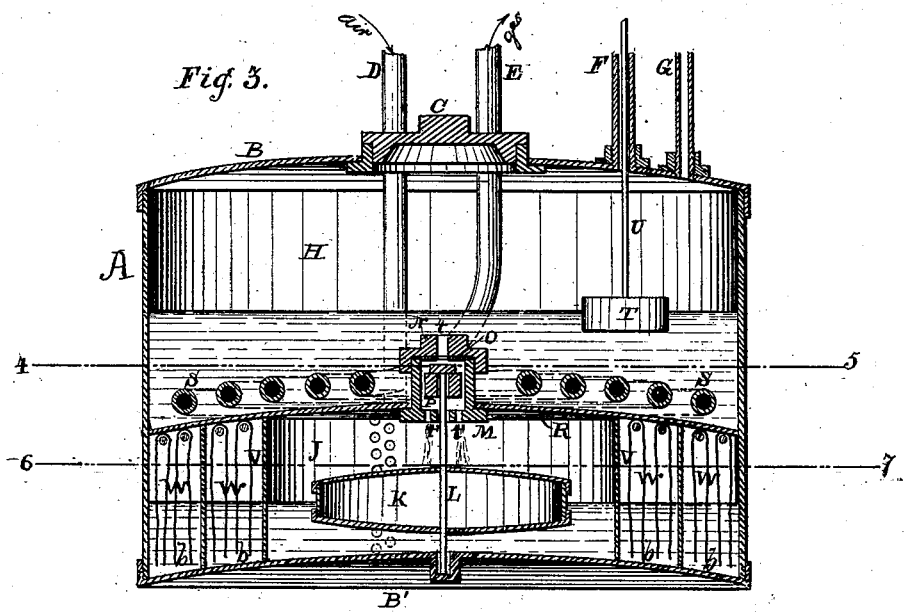
Figure 4:
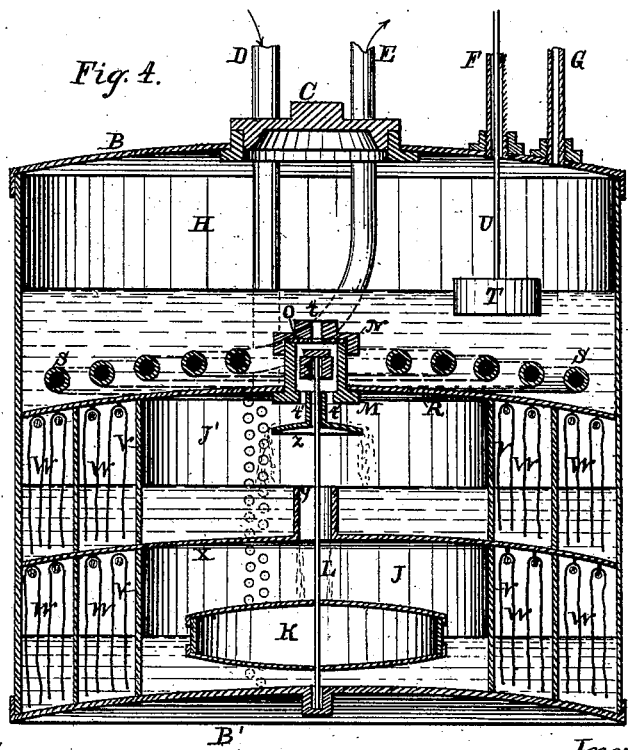
Figure 5:
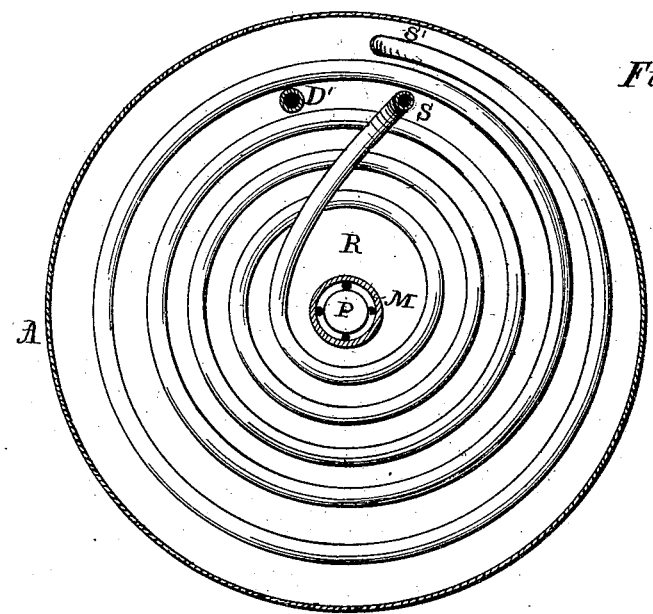
Figure 6:
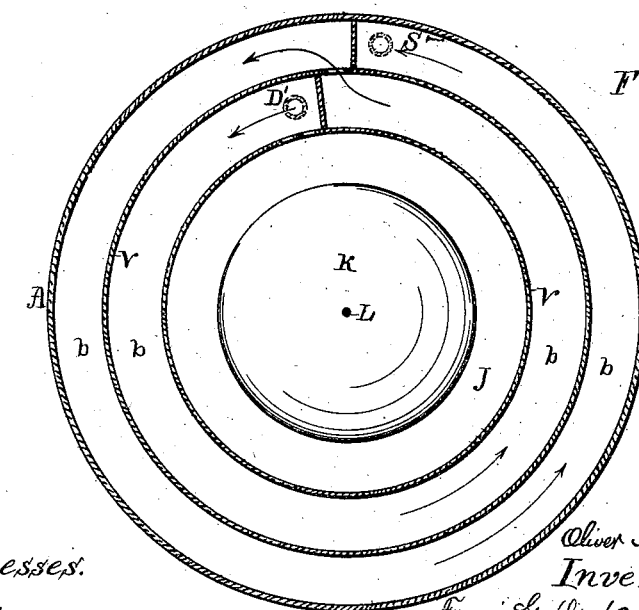

Figure 1 represents a side elevation of a cylindrical case, A, closed at the top and bottom, with raised heads B B', and a general view of the several connecting-pipes and the cap C. Fig. 2 represents a view of the top, and the relative location of the connecting-pipes and cap C. Fig. 3 is a vertical section of Fig. 1, taken on line 1 2, Fig. 2, showing the relative positions of the reservoir and carbureting-chambers, valve-case, condensing-coil, and cap C. Fig. 4 represents a view similar to Fig. 3, excepting that an additional carbureting-chamber is added. Fig. 5 represents a horizontal section of the reservoir-chamber, taken on the line 4 5, Fig. 3, just above the condensing-coil and the valve-case, showing the location of each. Fig. 6 is a horizontal section of the carbureter-chamber, taken on line 6 7, Fig. 3, showing the arrangement of the carbureting-channels b b, and the location of the float K.

Similar letters refer to similar parts wherever they occur on the drawings.

A, Fig. 1, represents a sheet-metal cylindrical case, closed at the top with the convex head B. A similar head, B', closes the bottom end. From the head B project several pipes, which are shown in location on Fig. 2. D represents the inlet-pipe; F, the vent-pipe; E, the outlet-pipe, and G the filling-pipe. F and G are closed with screw-caps. In the center of the head B there is a hand-hole, closed with the screw-cap C. H, Fig. 3, is the reservoir-chamber, and J the carbureter-chamber, separated from each other by the convex plate R. K represents a hollow sheet-metal float, with a small rod or spindle, L, passing through the center, and located centrally in the carbureter-chamber in such a position that when the carbureter-chamber is partially filled with gasoline, the float will rise and close the feed-valve P, located at the bottom of the reservoir H. M is a cylindrical flanged tube, closed at the top end with the screw-cap N, the flanged end being soldered at the center of the dividing-disk R, so that the body of the tube projects up into the reservoir-chamber. This tube M and cap N form the case for the valve P, which is made to play up and down freely in its case. The top side of the valve P is made flat, so as to fit the under side of the cap N, which, together with the leather disk o o, forms a seat for the valve, also a packing for the cap joint. t is a hole made through the center of the cap N, for the passage of the gasoline into the valve-case, and t' t' are several holes made through the bottom of the valve-case M for the escape of the gasoline into the carbureter. The valve P has a central hole, drilled from the under side, for the reception of the float-spindle L. A central hole in the bottom of the valve-case M forms the guide for the float-spindle; also, a similar hole with a cap is provided for the lower end of the float-spindle through the bottom disk B'. The arrangement of the float and its spindle with the valve resting on the upper end is such as to allow the top of the valve to stand about one-fourth of an inch below its seat N, when the float and spindle rest on its lower end, thus having the flowage orifice t in the cap N open, allowing the gasoline in the reservoir H to freely flow into the carbureter-chamber J until it is filled, so as to close the valve by raising the float K and spindle L.

S S (shown in Figs. 3, 4, and 5) represent a pipe condensing-coil, located at the bottom of the reservoir on the disk R, one end of the coil entering through the disk and communicating with the carbureter-chamber in the outside channel b, at S', as shown in Fig. 6. The other end of the coil terminates in the outlet-pipe E in the head B, Figs. 1 and 2.

The coil has a slight inclination toward the end connecting with the chamber J, so that any condensation resulting from the passage of gas through it will flow back to the carbureter-chamber J. The coil will always be covered by the gasoline in the reservoir on account of the valve-case projecting above the coil, as no gasoline can be drawn off below the entrance-hole $t$ in cap N.

T and U represent, respectively, a float and rod placed in the reservoir H, to indicate the amount of gasoline on storage. The vent-pipe F serves as a guide for the float-rod. When not in use the float is forced down to the bottom by means of the rod, and the pipe F closed with its cap, thus providing a convenient means of ascertaining at any time the amount of gasoline in the reservoir. The cap N of the valve-case can be got at and removed at any time by removing the cap C on the top cover B. The carbureter-chamber J, Fig. 3, is divided into several concentric channels, $b\ b$, by means of sheet-metal circles V V, soldered to the under side of disk R, leaving sufficient space at the center of the chamber for the float K, as shown in Figs. 3 and 4. These channels are partially filled with suspended bagging or other cloth, W W, thus forming an extended evaporating-surface, which may be lengthened by adding as many channels as may be desirable, all opening into each other, as shown in Fig. 6.

Fig. 4 represents an additional carbureting-chamber, which is illustrated to show the method of adding several chambers and filling all of them by means of one float-and-valve arrangement. The disk X, which separates the two carbureter-chambers, has a projecting tube, Y, at its center.

Z is a conical flange, soldered to a short tube projecting from the under side of the valve-case M. This conical flange is larger in diameter than the tube Y, and is intended to carry the gasoline passing out of the valve-case outside of the tube Y, thus insuring the filling of the chamber J up to the top of the tube Y before the lower one is filled, which will begin to fill as soon as the gasoline begins to flow over the tube Y. Suitable pipes are arranged to conduct the gas from over one chamber to the other, so as to pass through all of the several channels before passing out through the condensing-coil.

A carbureting apparatus made after the foregoing specifications will be found to work well, and to obviate many of the objections arising from common carbureters now in use, and will insure a more reliable and equal density of gas than can be obtained by any other means now in use.

What is claimed is—

1. The combination of the flanged tube M, its cap N, and the valve P with the division-disk R, whereby a direct communication is secured with chamber J from reservoir H without the use of connecting-pipes or stop-valves, as specified.

2. The combination of cap N, flanged tube M, and valve P with the division-disk R, the horizontal line of the cap N, where the conduit-hole $t$ enters, projecting above disk R into the reservoir H above the main body of the coil S S, resting on disk R, in order to secure a constant body of gasoline at the bottom of the reservoir H, which cannot be drawn off through the automatic feed-valve, as a condensing medium to always cover and surround coil S S, when in use, for the purposes specified.

3. The combination of the condensing-coil S S with the division-disk R, cap N, flanged tube M, valve P, chamber J, reservoir H, and outlet-tube E, whereby the main body of the coil S S shall rest on disk R at the bottom of reservoir H, below the outlet-conduit of the cap N, for the purpose set forth.

FRANK G. DRAKE,
*Administrator of the estate of*
*Oliver P. Drake, deceased.*

Witnesses:
H. L. HAZELTON,
THOMAS WENTWORTH.